United States Patent Office 2,892,818
Patented June 30, 1959

2,892,818
DETERGENT COPOLYMERS

Warren Lowe, Berkeley, William T. Stewart, El Cerrito, Frank A. Stuart, Orinda, and Frank W. Kavanagh, Berkeley, Calif., assignors to California Research Corporation, San Francisco, Calif., a corporation of Delaware No Drawing. Application March 26, 1956
Serial No. 573,617

7 Claims. (Cl. 260—78.5)

This invention relates to a novel lubricant composition, and it is particularly directed to the provision of a lubricant composition which is adapted to be employed in internal combustion engines.

With the refinements now being made in automotive and other internal combustion engines, a great deal of attention is being directed to the provision of a lubricant which will permit the engine to be operated at a high level of efficiency over long periods of time. The primary function of the lubricant is, of course, to reduce friction and thereby not only decrease the wear on pistons, piston walls, bearings and other moving parts, but also increase the efficiency of the engine. Additionally, it is also a function of the lubricant to prevent the deposition of solid products on the piston walls and other surfaces of the engine coming in contact with the lubricant. Such deposits seriously interfere with efficient engine operation for they accelerate piston ring and cylinder wall wear and also increase oil losses by plugging the oil ring grooves. The troublesome deposits which form on the face of the piston and on the other walls of the combustion chamber, as well as on valves and spark plugs are also partially attributable in many cases to the lubricant, and especially to various of the metal-containing additives employed therein. It is of importance to eliminate or at least minimize the formation of all such deposits, and it is the basic object of this invention to achieve such a result.

To a minor degree, certain of the deposits formed on engine surfaces have their origin in the oil itself, that is to say, in the decomposition products of the oil. A more important, though still minor, source of engine deposits lies in the additives with which oils are conventionally supplied. This is particularly the case with metal-containing additives as, for example, the organic, metal-containing salts which are incorporated in the oil to increase the detergency thereof, and the various metal-containing compounds which are added to increase the lubricity of the oil and reduce piston ring and cylinder wall wear. Whenever oil is burned in the engine (as occurs with the oil film present in the cylinder wall during the combustion stroke) any metal-containing additives present in the oil may form an ash which is partially deposited out on the various surfaces of the combustion chamber and on those of the spark plugs and valves. Accordingly, it is a particular object of this invention to provide a lubricant composition which is compounded with metal- or mineral-free detergents and wear-reducing additives.

While certain of the additives heretofore employed in oils (and to a lesser degree the oil itself) are partially responsible for deposits which form on engine surfaces, it is now recognized that the major source of such deposits or their precursors lies in the various aldehydes, acids, oxy-acids and other similarly reactive, partially-oxidized combustion products of the fuel. These products are formed both under pre-ignition conditions as well as during the combustion step proper, particularly during the period before the engine has reached operating temperature. Accordingly, under city driving conditions where the engine is repeatedly started in the cold condition and is seldom driven for a distance sufficient to reach the most efficient operating temperatures, the formation of partial oxidation products is particularly severe. Many of these partial oxidation products are carried down into the crankcase of the engine along with other blow-by gases, and since most are insoluble or only sparingly soluble in lubricating oils, they tend to separate from the oil and adhere to engine surfaces or form large droplets. In either case, under the elevated temperature conditions prevailing in the engine, these reactive monomers quickly polymerize to form solid masses which readily deposit out on the engine wall surfaces.

It is the practice in the art to prevent the formation of such deposits by adding to the lubricant a material normally referred to as a detergent. Insofar as is known, all the detergent additives which have heretofore been successfully employed on a commercial scale are organic, metal-containing compounds such as calcium petroleum sulfonate, calcium cetyl phosphate, calcium octyl salicylate, calcium phenyl stearate, the barium salt of wax-substituted benzene sulfonate, or the potassium salt of the reaction product of phosphorus pentasulfide and polybutene. Various of these detergents act by reacting chemically with deposit precursors to form harmless compounds. Others act to prevent flocculation or coagulation of solid particles in the oil and maintain the same in a state of suspension as finely divided particles. Still others not only perform this dispersant function but also effect the solubilization or emulsification of the sparingly soluble monomers in the oil and thereby greatly reduce the rate of polymerization. In the latter case, such polymer materials as do then form within the body of the oil are smaller in size and can be peptized or dispersed in the oil much more readily than is the case with the large polymeric particles which are formed on exposed engine surfaces or in droplets lying without the oil.

Detergents capable of acting in the latter fashion are preferably employed wherever possible, particularly in automotive engines to be operated under city driving conditions. However, even among the metal-containing additives, few are available which are capable of solubilizing any appreciable amount of all the many types of polymer precursors which are carried into the oil from the fuel. Accordingly, it is a more particular object of this invention to provide a lubricant composition incorporating a metal-free detergent which is capable of solubilizing or emulsifying in the lubricant large amounts of all the various partial oxidation products of the fuel which are carried into the oil, and which is also capable of maintaining in suspension in the oil the various solid polymeric materials which are present therein.

The problem of piston ring and cylinder wall wear, especially the control thereof, is also one which is closely related to the composition of the crankcase lubricant. Aside from abrasive wear, which is caused by dust and dirt and can be remedied by suitable filtering and air-cleaning means, a large part of the wear experienced by piston rings and cylinder wall is attributable to chemical attack by moisture and acidic products originating as by-products of fuel combustion. In engines operated at optimum temperature levels, these combustion products are largely discharged through the exhaust and breather pipe. However, under the relatively "cold" conditions experienced in city driving, and especially at cylinder wall temperatures below about 150° F., the moisture and acid products are condensed on the engine surfaces where they promote corrosive attack and are in a position to work past the piston and accumulate within the engine and in the crankcase oil. This difficulty is one which the art has heretofore met most successfully by supplying the lubricating oil with additives such as the various metal salts of petroleum sulfonic acids and other metal-organic compounds, especially those having a basic reaction. However, this practice has a disadvantage of adding still another metal-containing ingredient to the oil and therefore of increasing the deposit-forming characteristics of the lubricant composition. Accordingly it forms still another object of this invention to provide a lubricant composition containing a metal- or mineral-free additive which effectively decreases the wear experienced by piston rings and cylinder walls, particularly during periods before the engine has become thoroughly warmed to operating temperatures.

The present invention is based on the discovery that certain copolymers, which contain no metal component and therefore are substantially free of any ash-forming tendency, have the ability to impart excellent detergent and antiwear qualities to lubricating oils employed in internal combustion engines. In particular, these copolymers have the ability to solubilize in the oil large amounts of all the various partially oxidized combustion products of the fuels employed in internal combustion engines, while also having the ability of maintaining in a state of suspension any solid polymeric products present in the oil. Additionally, the copolymeric additives of the present invention effectively reduce the wear experienced by piston rings and cylinder wall surfaces even under the most unfavorable operating conditions such as are experienced during the starting and warming up of the engine. These additives have the advantage that they do not combine chemically with the various polymer precursors which are solubilized or dispersed in the oil, nor apparently do they act by a neutralization reaction in counteracting the effect of the various acidic fuel combustion by-products. Accordingly, they are capable of giving excellent protection against engine deposits and wear over extended operating periods. It should also be noted that the copolymeric additives of this invention are noncorrosive to the various bearing metals employed in engines.

Since the additives of the present invention differ in kind from any heretofore proposed for either detergent or antiwear purposes, it would have been surprising to discover that they were effective for either of these purposes. However, that they possessed not one but both of said qualities was altogether unexpected and could not have been predicted.

The polymeric additives of the present invention are copolymers of monomers selected from at least each of the first two classes of the classes consisting of (A) oil-solubilizing compounds having a polymerizable ethylenic linkage and containing a hydrocarbyl group of from 4 to 30 aliphatic carbon atoms, (B) esters of $\alpha,\beta$-unsaturated, $\alpha,\beta$-dicarboxylic acids of from 4 to 12 carbon atoms each and anhydrides thereof wherein the carboxyl groups of said acids are monoester-linked to a member of the group consisting of polyalkylene glycols having of from 2 to 7 carbon atoms in each alkylene group and alkyl ethers thereof, (C) esters of $\alpha,\beta$-unsaturated monocarboxylic acids from 3 to 15 carbon atoms each, wherein the carboxyl groups of said acids are monoester-linked to a member of the group consisting of polyalkylene glycols having from 2 to 7 carbon atoms in each alkylene group and alkyl ethers thereof and (D) acidic compounds selected from the group consisting of $\alpha,\beta$-unsaturated monocarboxylic acids of from 3 to 15 carbon atoms each, $\alpha,\beta$-unsaturated, $\alpha,\beta$-dicarboxylic acids of from 4 to 12 carbon atoms each, anhydrides thereof and half-esters thereof, the alcohol portion of the ester group being as defined in (B) and (C) or hydrocarbon containing from 4 to 30 aliphatic carbon atoms. Representative copolymers coming within the scope of the present invention are, for example, allyl stearate, didodecyl maleate, and dodecyl nonaethylene glycol maleate; and dodecyl methacrylate, allyl stearate, mono-(methoxydodecaethylene glycol)maleate and maleic anhydride.

The oil-solubilizing monomer portion of the polymeric additives of this invention can be any compound having at least one ethylenic linkage ($>$C=C$<$), together with at least one substituent group which contains an oil-solubilizing hydrocarbyl group of from 4 to 30 aliphatic carbon atoms, and which is characterized by the ability to copolymerize through said ethylenic linkage with the polar monomer referred to above in the presence of a suitable catalyst. Alternatively, the oil-solubilizing aliphatic radical can be introduced into the copolymer, as will hereinafter be more fully described. This aliphatic radical, whether present in the original monomer or introduced into the copolymer, imparts oil solubility to the polymer and is preferably a branched or straight-chain alkyl radical or a cycloalkyl radical such as butyl, isobutyl, n-pentyl, n-hexyl, 2-ethylhexyl, decyl, dodecyl, tetradecyl, cyclohexyl, 4-ethylcyclohexyl, or the like, or an alkenyl radical such as oleyl, ricinoleyl, or the like, wherein the ethylenic double bond has substantially no copolymerizing tendency. Oil solubilizing monomers of this general character are well known in the art and are frequently employed as the oil-solubilizing portion of copolymers which are added to lubricating oils to improve the viscosity index and pour point characteristics thereof. They include such materials as olefins and ethylenically unsaturated ethers, esters, ketones, aldehydes, and the like.

The oil solubilizing monomers of component (A) may also be illustrated by the following general formula:

$$R_1(G')_{n'}\cdot CH=CH(G)_n R_2$$

in which $R_1$ and $R_2$ are members of the group consisting of hydrogen and hydrocarbon radicals of from 4 to 30 carbon atoms, at least one of which contains an aliphatic hydrocarbon group of from 4 to 30 carbon atoms as described above, G and G' are members of the class consisting of oxy (—O—), carbonyl

and carbonyloxy

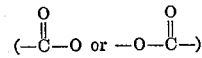

groups and combinations thereof with not more than two alkylene groups of from 1 to 7 carbon atoms each, and $n$ and $n'$ are 0 or 1. When $R_1$ and $R_2$ are hydrocarbon radicals, they may be alkyl, cycloalkyl, alkenyl, cycloalkenyl, aryl, alkaryl or aralkyl in structure, as illustrated by radicals such as 2-ethylhexyl, cyclohexyl, hexenyl, cyclohexenyl, phenyl, naphthyl, tertiary butylphenyl benzyl, etc., with the preferred radicals being as previously mentioned.

Representative oil-solubilizing monomer compounds which can be employed to form the copolymeric additives of the present invention include the following:

OLEFINS

Hexene-1
2-ethylhexene-1
Di- and triisobutylene
Tripropylene
Dodecene-1
Hexadecene-1
Cyclohexene
Octadecene-1
4-octylcyclohexene-1
3-phenylhexadecene-1
p-Octylstyrene
Vinylcyclohexane
2-hexadecylbutadiene-1,3
p-Tertiarybutylstyrene

ETHERS

Vinyl n-butyl ether
Vinyl 2-ethylhexyl ether
Allyl n-butyl ether
Allyl isobutyl ether
Allyl cyclohexyl ether
Allyl 4,4,8,8-tetramethyl-docosyl ether
Methallyl n-hexyl ether
Methallyl n-decyl ether
Methallyl 2-ethylhexyl ether
Methallyl octadecyl ether
Propenyl 2-ethylhexyl ether
Crotyl n-octyl ether
Isopropenyl dodecyl ether
1-decenyl butyl ether
1-eicosenyl decyl ether
Vinyl p-octylphenyl ether
Methallyl p-tert. butylphenyl ether
1-decenyl p-cetylphenyl ether
1-decenyl 2-phenylbutyl ether

ESTERS

| | |
|---|---|
| Vinyl caproate | Cyclohexyl methacrylate |
| Vinyl palmitate | Cyclohexyl 2-dodecenoate |
| Vinyl oleate | Decyl vinylacetate |
| Allyl caprylate | Isooctyl α-chloroacrylate |
| Allyl laurate | p-Isoamylphenyl 2-hexadecenoate |
| Allyl oleate | 4-p-tolylbutyl 2-octadecenoate |
| Allyl palmitate | Undecyl cinnamate |
| Allyl stearate | Methylcyclohexyl 2-ethyl-2-hexenoate |
| Allyl-2-ethylhexanoate | |
| Allyl ricinoleate | 5-ethyldocosyl crotonate |
| Allyl esters of babassu acids | Octadecyl isocrotonate |
| Allyl esters of lard acids | n-Butyl 2-eicosenoate |
| Allyl naphthenate | p-Tert. amylphenyl octadecyl maleate |
| Methallyl caproate | |
| Methallyl naphthenate | p-Hexadecylphenyl 2-ethylhexyl maleate |
| Methallyl ricinoleate | |
| Methallyl p-octylbenzoate | o-Tolyl 2-octadecylcyclohexyl maleate |
| Methallyl oleate | |
| Methallyl cyclohexane carboxylate | o-Nonylphenyl-hexadecyl maleate |
| | Dihexadecyl maleate |
| Methallyl palmitate | Di-methylcyclohexyl maleate |
| Crotyl oleate | Mono-2-ethylhexyl maleate |
| Crotyl naphthenate | Di-2-ethylhexyl maleate |
| α-Methylcrotyl palmitate | Di-dodecyl maleate |
| 1-propenyl naphthenate | Di-dodecyl mesaconate |
| 1-propenyl elaidate | Di-dodecyl citraconate |
| Dodecyl acrylate | o-Tolyl octadecyl itaconate |
| Hexadecyl methacrylate | Mono-hexadecyl itaconate |
| Isobutyl α-decylacrylate | Isopropenyl palmitoleate |
| Vinyl p-n-octyl benzoate | 1-decenyl laurate |
| Allyl 3,5-diisobutyl benzoate | 1-hexadecenyl myristate |

Although any of the oil solubilizing compounds described above will give effective copolymer compositions for lubricant compositions in accordance with the present invention, higher alkyl esters of α,β-unsaturated monocarboxylic acids of from 3 to 6 carbon atoms having alkyl groups of from 8 to 30 carbon atoms are most preferred, both for availability and effectiveness of copolymers prepared from them. Representative acids of this type are the acrylic, methacrylic, crotonic, tiglic, angelic, α-ethylacrylic, α-methylcrotonic, α-ethylcrotonic, β-ethylcrotonic, β-propylcrotonic, and hydrosorbic acids and the like. Even more desirable are the alkyl esters of acrylic and methacrylic acids containing from 10 to 20 carbon atoms in the alkyl groups, since they are found to provide highly superior polymers for the lubricant compositions of the invention and are obtainable in commercial quantities.

Various copolymers employing representative oil-solubilizing monomers of the foregoing types were prepared to illustrate the oil solubilizing effect of the monomers on the resultant copolymers. The solubility of the copolymers in oil and their suitability as lubricating oil additives were demonstrated by incorporating the copolymers into lubricating oils. The lubricant compositions thus obtained were tested to determine their detergency and deposition properties. The results of these tests are given in Table I below.

In the tests the base oil, unless otherwise indicated, is a solvent-refined, wax-free, SAE-30 grade mineral lubricating oil having a viscosity index of 85 which is derived from California waxy crude. Various amounts of the copolymers are incorporated into the oil as indicated in terms of percent by weight.

The piston varnish ratings of the lubricant compositions were obtained by the standard FL-2 test procedure as set out in the June 21, 1948 report of the Coordinating Research Council. In this test the lubricating oil compositions were tested as crankcase lubricants in a 6-cylinder Chevrolet engine, using a low-grade gasoline especially prone to cause engine deposits. At the end of each test the engine was dismantled and the detergency or deposition properties of the lubricant compositions were determined by examining the engine deposits on the piston and visually rating them as to the amount of piston varnish present. The piston varnish ratings of the compositions are given in numerical terms on a scale of 0–10 with "10" representing the complete absence of deposits.

The deposition characteristics of the lubricant compositions containing the copolymeric additives were also determined in the lacquer deposition test. In this test typical engine fuel combustion products were passed into the lubricant compositions and the ability of the lubricant compositions to solubilize and retain the lacquer-forming materials was observed by weighing the amount of lacquer deposits formed on a fresh iron catalytic surface for a standard period of time. The lacquer deposit of the lubricant composition is taken as the number of milligrams deposit on the metal surface, and may be correlated directly to the piston varnish rating obtained in the standard FL-2 test procedure outlined in the above paragraph.

Both the FL-2 test procedure and the lacquer deposition test are more fully described in the disclosure which follows with regard to the particular lubricant composition of the present invention.

*Table I*

| Lubricant composition | Ratio of (1) monomer to (2) monomer to (3) monomer | Piston varnish rating | Lacquer deposit (milligrams) | Piston varnish rating (estimated from lacquer deposit) |
|---|---|---|---|---|
| Base oil alone | | 3.0 | 850 | |
| 2.8% (1) dodecyl methacrylate, (2) N,N'-di-2-hydroxy-ethyl maleamide | 20/1 | | 450 | 5.0 |
| 2.8% (1) dodecyl methacrylate, (2) allyl stearate, (3) maleic anhydride | 20/1/1 | | 405 | 5.2 |
| 1.5% (1) dodecyl methacrylate, (2) N-(2-hydroxyethyl) methacrylamide | 7/1 | 6.3 | | |
| *3.0% (1) tridecyl methacrylate, (2) octadecyl methacrylate, (3) monododecyl ether of hexadecaethylene glycol [a] methacrylate | 10/6/1 | 8.4 | | |
| 2.5% (1) allyl stearate, (2) didodecyl maleate, (3) di-(hydroxyethyl) ethylenediamine salt of monododecyl maleate | 5/5/2 | 5.5 | | |
| 2.8% (1) vinyl ethylhexoate, (2) itaconic acid | 15/1 | | 500 | 4.5 |
| 2.8% (1) vinyl stearate, (2) maleic anhydride, (3) monododecyl ether of pentaethylene glycol [b] methacrylate (4) methacrylamide | 30/1/2/1 | | 325 | 6.0 |
| 2.5% (1) allyl stearate, (2) ethylene glycol mono-oleate monomaleate, (3) mono-N,N'-di(2-hydroxy-ethyl) ethylenediamine maleate (salt) | 5/4/1 | 4.0 | | |
| 2.8% (1) octadecene, (2) monododecyl maleate, (3) monopentaerythritol maleate | 2/1/1 | | 500 | 4.5 |
| 2.8% (1) hexene-1, (2) dodecyl methacrylate, (3) methacrylic acid, (4) monododecyl ether of eicosaethylene glycol [c] methacrylate | 25/25/1/4 | | 400 | 5.5 |
| 2.8% (1) di-2-ethylhexyl fumarate, (2) octadecene-1, (3) crotonic acid, (4) monotridecyl ether of decaethylene glycol [d] methacrylate | 25/25/8/2 | | 570 | 4.0 |
| 2.8% (1) allylethyl ether, (2) vinyl stearate, (3) itaconic acid, (4) monododecyl ether of decaethylene glycol [d] crotonate | 14/50/7/3 | | | |
| 3.0% (1) vinyl 2-ethylhexyl ether, (2) tetradecylphenyl maleate, (3) dodecyl maleate, (4) maleic acid | 6/3/1/2 | 4.6 | | |
| 1.5% (1) dodecyl acrylate, (2) monododecyl ether of decaethylene glycol [d] acrylate (3) acrylic acid | 780/9/1 | 5.6 | | |
| 1.5% (1) hexadecyl styrene, (2) methacrylic acid | 5.8/1 | 5.9 | | |

*In 140 Neutral Mineral Lubricating Oil from solvent-refined waxy California crude.
[a] Polyethylene glycol of 704 N.W.
[b] Polyethylene glycol of 220 N.W.
[c] Polyethylene glycol of 880 M.W.
[d] Polyethylene glycol of 440 M.W.

From the above test data it will be seen that all of the various oil-solubilizing monomers representative of the aforementioned types were effective in the production of useful, copolymeric lubricating oil additives which are capable of preventing deposits from lubricant compositions under typical engine operating conditions. These monomers, as previously described, constitute a definite, recognized class of compounds which have been used heretofore in the art in the production of polymeric lubricating oil additives of the nonpolar type, such as VI improvers and pour point depressants. Although the results demonstrate beyond any reasonable doubt the suitability of the different oil-solubilizing monomers within the terms of the description in the production of oil soluble copolymers, it should be understood that the efficacy of each individual class of copolymers as detergents is primarily dependent upon the particular polar or functional group in the so-called polar monomer and its relationship to the rest of the copolymer.

Since the functionality of the individual polar groups differs and is largely empirical in nature, no conclusion is intended to be drawn concerning equivalency of the various copolymeric lubricating oil additives employed as detergents in this illustration. The polar groups of the particular class of copolymers of the compositions of this invention and their balance or relationship to the remainder of the copolymers are more fully discussed in the disclosure which follows, along with additional examples of the invention.

The $\alpha,\beta$-unsaturated carboxylic acids referred to herein can be monocarboxylic in character, as represented by acrylic, methacrylic, crotonic, tiglic and angelic, $\alpha$-ethylacrylic, $\beta$-ethylcrotonic, or the like, or they can contain more than one carboxyl group. Representative polycarboxylic acids are maleic, fumaric, itaconic, glutaconic, citraconic, mesaconic and aconitic acids. In referring herein to said acids, and particularly to those of a polybasic character, it is also intended to include a corresponding anhydride thereof where the same are available. Thus, in cases where the copolymer incorporates an ester of maleic acid it is possible to substitute the corresponding anhydride for the acid in forming the copolymer. The resulting anhydride units can be esterified in the usual fashion, and any such units not thus converted to ester linkages can either be hydrolyzed to carboxyl groups or left as anhydride units in the finished copolymer.

The $\alpha,\beta$-unsaturated monocarboxylic acid components of the copolymeric additives employed in this invention have the general formula

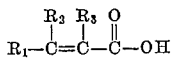

where the $R_1$'s, $R_2$'s and $R_3$'s, which can be the same as or different from one another, are selected from the group consisting of hydrogen atoms and alkyl groups of from 1 to 4 carbon atoms.

The $\alpha,\beta$-unsaturated, $\alpha,\beta$-dicarboxylic acid components of the copolymeric additives have the structural formula

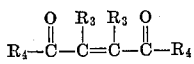

wherein the $R_3$'s, which may be the same as or different from one another, are hydrogen atoms or alkyl groups of from 1 to 4 carbon atoms each, and the $R_4$'s represent (1) a common O radical (in which case the compound is an acid anhydride), or (2) both $R_4$'s represent —OH radicals.

The polyalkylene glycols and alkyl ethers thereof used in the esterification of the copolymeric (B) and (C) components of the copolymer additives of the invention contain from 2 to 7 carbon atoms in each alkylene group, as already mentioned. Poly-1,2-alkylene glycols and and their alkyl ethers having molecular weights between 134 and 30,000 are preferred. Such glycols may be obtained by polymerizing 1,2-alkylene oxides or mixtures thereof in the presence of a catalyst and a suitable initiator for the reaction such as water, monohydric alcohol in the case of the allyl ethers, mercaptan and the like. The preparation of polyglycol compounds of this type has been fully described heretofore in U.S. Patents 2,448,664 and 2,457,139, for example, and, therefore, requires no detailed discussion here.

For present purposes, the most suitable poly-1,2-alkylene glycols are those derived from ethylene oxide or from 1,2-propylene oxide or mixtures thereof and their alkyl ethers of 1 to 18 carbon atoms per alkyl group which have molecular weights or average molecular weights between about 200 and 1,000, or higher, preferably between about 400 and 10,000. Esterification with these polyalkylene glycols is found to provide the most effective detergent and wear inhibiting compositions.

The following polyalkylene glycols containing from 2 to 7 carbon atoms in each alkylene group are illustrative of the types described above.

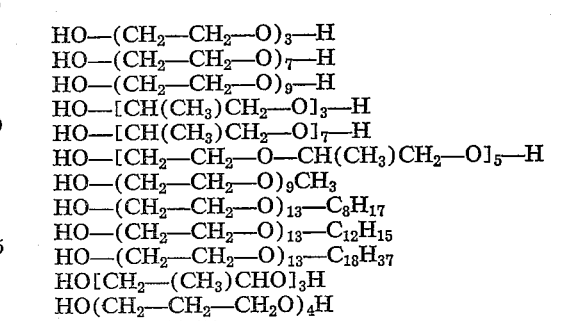

Polyethylene glycol mixtures having average molecular weights of 200, 400, 1000, 1540, 2,000 or 10,000.
Poly-1,2-propylene glycol mixtures having average molecular weights of 425, 1025 or 10,000.

In preparing the copolymers of this invention, it is important to obtain a final product which is oil soluble, i.e., which is soluble in the petroleum or other lubricating oil employed, to the extent of at least 0.5%, and preferably 2% or more by weight. Since the various oil-solubilizing monomer components differ somewhat in their oil-solubilizing characteristics, preliminary tests are made with the polymeric additive to determine whether the relative proportion of oil-solubilizing monomer compound in the copolymer is high enough to impart the desired degree of oil solubility. If the solubility in oil is unduly low, and if there remain uncombined carboxyl groups in the copolymer, the oil-solubility thereof can normally be remedied by esterifying a portion of said carboxyl groups with a higher alcohol, e.g., a $C_8$ or higher aliphatic alcohol such as n-octanol, 2-ethylhexanol, decanol, dodecanol (lauryl alcohol) or the like.

Alternatively, the polymerization reaction can be repeated employing a higher proportion of the oil-solubilizing component and/or esterifying a lower proportion of the available carboxyl groups with the polyalkylene glycol. In general, however, in the case of those polymers prepared from oil-solubilizing components which contain aliphatic oil-solubilizing groups of from 4 to 30 carbon atoms, good oil-solubility, coupled with the ability to impart excellent antiwear and detergent properties to the oil, is obtained by employing those copolymer which contain from 1 to 20 of said oil-solubilizing monomer units for each monomer unit of $\alpha,\beta$-unsaturated, $\alpha,\beta$-dicarboxylic acid, acid anhydride, or ester thereof, and $\alpha,\beta$-unsaturated mono-carboxylic acid or ester thereof which is present in the polymer, and wherein there are present from 0 to 15 free carboxyl groups (or an equivalent number of acid anhydride units) for each monomer unit of ester-linked polyglycol present in the copolymer, there being at least one of said polyglycol units in each polymer molecule. Preferably, said polymers contain from about 3 to 20 hydrocarbyl radicals of the type which contain a group of from 4 to 30 aliphatic carbon atoms and are capable of imparting oil solubility to the polymer, for each free carboxyl group present in the polymer; further, the polymer preferably contains a total of not more than 10 of said free carboxyl groups for each of the ester-linked polymeric glycol radicals present. Within said limits, a still more preferred class of polymers for use in the present invention is made up of those which contain from about 1 to 4 of the said ester-linked polyglycol radicals in the molecule. In referring herein to the relative number of $C_4$–$C_{30}$ aliphatic oil-solubilizing group, reference is had to the total number of such groups which are present in the polymer and includes those which form a part of the oil-solubilizing monomer component proper, as well as those which are ester-linked to an $\alpha,\beta$-unsaturated, dicarboxylic acid monomer component.

Although effective copolymers according to the invention are obtained with proportions of oil-solubilizing (A) monomer units and polar (B), (C) and (D) monomer units within the aforementioned ranges, it has been noted that in a preferred application of the copolymeric lubricating oil detergent additives of the present invention in mineral lubricating oil, a certain optimum relationship appears to exist between the total number of solubilizing aliphatic carbon atoms and the total number of polar groups within the molecule. This optimum relationship which is termed "polar balance" for convenience, is expressed by the formula $$PB = \frac{\Sigma(N_p \times P)}{N_s}$$

in which PB=polar balance, $N_p$=number of a certain polar group, P=polarity constant for the polar group, $N_s$=number of solubilizing aliphatic carbon atoms.

The polarity constant for free carboxyl polar groups (—COOH) is 100. For hydroxyl polar groups, the polarity constant is 50. For alkylene oxide groups (—RO—, where R is an alkylene group, preferably ethylene or propylene), the polarity constant is 15. The solubilizing aliphatic carbon atoms to be considered are the following:

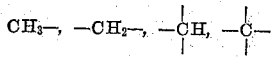

and excluding aromatic ring carbon atoms and the carbon atom of carbonyl groups.

The polar balance of a given copolymer according to the above formula is equal to the sum of the number of each type of polar group multiplied by its polarity constant, said sum being then divided by the number of solubilizing aliphatic carbon atoms. For best performance, the polar balance is approximately 1. However, very effective copolymeric lubricating oil detergent additives may have polar balances in the range from 0.30 to 3.00.

The copolymers employed in a practice of this invention can be prepared by any one of several methods, as known in the art. Thus, one may polymerize a mixture of the desired monomer components to form the desired polymer. The reaction is easier to control, however, by starting with suitable precursor compounds, with the desired monomer units then being formed by the appropriate treatment of the resulting polymeric intermediate product. Thus, one may first copolymerize a given oil-solubilizing compound such as an alkyl methacrylate with a suitable acid component such as methacrylic acid or maleic anhydride; the resulting polymer is then reacted with a polyalkylene glycol whereby a portion or all of the free —COOH groups in the polymer intermediate become monoester-linked to the polyalkylene glycol. Other possible variations in the nature of the reactants and in the selection of a suitable reaction path would also suggest themselves to those skilled in the art.

When the polymeric additive of this invention, or a suitable polymeric intermediate, is to be prepared by reaction of monomeric components, said polymers can be prepared by conventional bulk, solution or emulsion methods in the presence of an addition polymerization initiator. Preferably, however, the copolymerization is effected in an inert organic solvent such as benzene, toluene, xylene or petroleum naphtha in the presence of a free radical-liberating type of initiator such as a peroxy compound, for example, benzoyl peroxide, acetyl peroxide, tert. butyl hydroperoxide, di-tert. butyl peroxide, dibenzoyl peroxide, or di-tert. amyl peroxide, or an azo initiator such as 1,1'-azodicyclohexanecarbonitrile or $\alpha,\alpha'$-azodiisobuteronitrile. The catalyst, or polymerization initiator, can be employed in an amount of from about 0.1 to 10%, with a preferred range being from 0.10 to 2%. If desired, the catalyst can be added in increments as the reaction proceeds. Likewise, additional portions of the solvent can also be added from time to time in order to maintain the solution in a homogeneous condition. The temperature of copolymerization varies from about 170 to 300° F., with the optimum temperature for any given preparation depending on the nature of the solvent, the concentration of monomers present in the solvent, the catalyst, and the duration of the reaction. Much the same conditions are employed when the copolymerization is effected in bulk rather than in the presence of an inert solvent.

The copolymer additives of the invention have apparent molecular weights as determined by standard light scattering methods of at least 2,000 and preferably 8,000. For practical purposes, molecular weights of from 100,000 to 1,000,000 are most suitable from the standpoint of viscosity and other physical characteristics of the polymeric additives. A preferred group of copolymers in accordance with the present invention is made up of those in which the $\alpha,\beta$-carboxylic acids employed in the (B), (C) and (D) monomers contain not more than 8 carbon atoms. $\alpha,\beta$-unsaturated dicarboxylic acids having 4 to 8 carbon atoms are particularly preferred as the acids of the copolymers.

Typical methods for preparing the copolymers which can be employed with success as detergents and anti-wear additives in lubricant compositions are given in the following examples.

EXAMPLE I

To a glass reaction flask equipped with stirring means, thermometer, reflux condenser and dropping funnel were charged 98 g. (1 mole) of maleic anhydride and 324 g. (1 mole) of allyl stearate along with about 10 cc. of benzene. The contents of the flask were heated to about 225° F. while stirring. About 6.3 g. of benzoyl peroxide dissolved in 10 cc. of benzene was added to the mixture over a period of about 4 hours. The temperature was maintained between about 200 and 230° F. by heating or cooling as necessary during the addition. 4.2 g. of tertiary butyl hydroperoxide was then added, following which the mixture was thoroughly stirred and allowed to stand for 18 hours at 218° F. The mixture thus obtained was distilled to a temperature of 370° F. under a vacuum equal to about 1 mm. of mercury pressure. The product was a glassy appearing copolymer containing equimolar proportions of maleic anhydride and allyl stearate and having an apparent molecular weight of about 90,000 as determined by standard light scattering methods.

150 g. of allyl stearate and maleic anhydride copolymer prepared as described above was mixed in 1:1 mole ratio with 21.5 g. of methoxy dodecaethylene glycol, the theoretical amount required to mono-esterify 11% of the anhydride groups. 1.0 g. of p-toluene sulfonic acid monohydrate and 67 cc. of xylene were added to the mixture. The mixture was stirred and heated at about 320° F. for about six hours. Xylene was withdrawn until the reflux temperature of the mixture rose to 350° F. 0.9 g. more of catalyst was added. The mixture was stirred and heated at about 350° F. for about six hours. The xylene was then stripped off by vacuum distillation to yield the copolymer of allyl stearate, maleic anhydride and mono(methoxy dodecaethylene glycol)maleate in 3:2:1 mole ratio.

EXAMPLE II 77 g. (0.182 mole) of allyl stearate and maleic anhydride copolymer in 1:1 mole ratio as described in Example I and 42.4 g. of dodecyl alcohol were charged to a two-liter, three-necked flask. 260 cc. of xylene and 0.25 g. p-toluene sulfonic acid monohydrate were added. The contents of the flask were refluxed for 16 hours at about 340 to 370° F. Following this, 0.1 g. more catalyst was added and stirring was continued for 8 hours longer. 3.8 cc. of water was collected corresponding to a theoretical of 4.1 for the esterification of 62.5% of the available acid groups in the copolymer.

163.8 g. of nonaethylene glycol (200% excess over theoretical required to esterify the free acid), 75 cc. of xylene, 75 cc. of toluene and 0.25 g. of p-toluene sulfonic acid monohydrate catalyst were added to the mixture obtained above. The mixture was refluxed for 12 hours. Some solvent was withdrawn to allow the temperature to rise to 340 to 355° F. while the stirring was continuing. The solvent was stripped from the mixture and the residue was purified by dissolving it in benzene and then precipitating with acetone and methanol. The product was a copolymer of allyl stearate, didodecyl maleate and dodecyl monaethylene glycol maleate in 3:2:1 mole ratio.

EXAMPLE III 85 g. (0.201 mole) of allyl stearate and maleic anhydride 1:1 copolymer was reacted with 61.75 g. of dodecyl alcohol in the presence of 0.25 g. of p-toluene sulfonic acid monohydrate using the procedure outlined in the above examples. 82.5% of the available acid was thus esterified.

The copolymer of allyl stearate, didodecyl maleate and monododecyl maleate thus prepared was reacted with 84.3 g. of nonaethylene glycol, a 200% excess over the theoretical amount required to esterify the remaining acid. The resulting copolymer mixture was purified as described above to yield the copolymer of allyl stearate, didodecyl maleate and dodecyl nonaethylene glycol maleate in 5:4:1 mole ratio.

EXAMPLE IV

A maleic anhydride-dodecyl methacrylate-allyl stearate copolymer was synthesized by mixing 254 grams (1 mole) of dodecyl methacrylate, 5 grams (0.05 mole) of maleic anhydride and 16.2 grams (0.05 mole) of allyl stearate in a three-necked reaction flask fitted with a stirrer, condenser and thermometer in accordance with the procedure of the above examples. The mixture was heated to 220° F. and 2 grams of benzol peroxide were added over a period of 2 hours. During this time, the temperature was maintained at 215–225° F. by either heating or cooling as required. Following the addition of the catalyst, the mixture was held at 215–225° F. for about 18 hours and then stripped to 380° F. at 1 mm. mercury pressure to yield 260 g. of a viscous, oil-soluble polymer shown by analysis to contain dodecyl methacrylate, allyl stearate and maleic anhydride in a molal ratio of approximately 20:1:1.

100 g. of dodecyl methacrylate, allyl stearate and maleic anhydride copolymer in 20:1:1 mole ratio, prepared as described above, was reacted with 21 g. of methoxy dodecaethylene glycol in the presence of 0.43 g. of p-toluene sulfonic acid monohydrate catalyst and sufficient xylene to allow refluxing at 300° F. The reaction mixture was stirred and heated for 9 hours under reflux conditions. 50 g. of methoxy dodecaethylene glycol and 0.86 g. more of catalyst were then added. Some xylene withdrawn to raise the reaction temperature to about 350° F. After about 4 hours the solvent was striped off. The reaction product was purified by dissolving it in benzene and cyclohexane and passing the solution through a silica gel column. Analysis of the purified product showed that 20% of the available acid was esterified. The product was thus the copolymer of dodecyl methacrylate, allyl stearate, mono(methoxy dodecaethylene glycol)maleate and maleic anhydride in 20:1:0.4:0.6 mole ratio.

330 g. of 140 neutral mineral lubricating oil was combined with 75 g. of the above copolymer to provide an excellent lubricating oil concentrate containing 18.5% by weight of the active polymeric detergent.

EXAMPLE V 389 g. (1.53 moles) of dodecyl methacrylate, 7.5 g. (0.076 mole) of maleic anhydride, and 10 cc. of benzene were charged to a three-necked flask fitted with a stirrer, thermometer, reflux condenser, and dropping funnel. The mixture was heated to 220–225° F. with stirring. A solution of 3 g. of benzoyl peroxide and 3 g. of tertiary butyl hydroperoxide in 60 cc. of benzene was then added over a period of 6 hours after which time the mixture was kept at 205° F. for approximately 18 hours. The product was stripped to 370° F. at 1 mm. mercury pressure to give 375 g. of a viscous, oil-soluble polymer shown by analyses to contain dodecyl methacrylate and maleic anhydride in a molar ratio of approximately 20:1.

A mixture of 87 g. of dodecyl methacrylate and maleic anhydride 20:1 copolymer, 7.3 g. (0.0083 mole) of monododecylether of hexadecaethylene glycol (molecular weight 886), 0.2 g. of p-toluene sulfonic acid monohydrate, and xylene was charged to a three-necked reaction flask fitted with a stirrer, thermometer, reflux condenser, and water receiver. The mixture was stirred and heated at reflux temperature, 320° F., for a period of 7½ hours. Xylene was then withdrawn by distillation to give a refluxing temperature of 350° F. The mixture was kept at this temperature for a period of two hours. The mixture was then stripped to 380° F. at 1 mm. mercury to give a product which on analysis was shown to contain a dodecyl methacrylate and maleic anhydride copolymer in which 25% of the available free acid was esterified with the monododecylether of hexadecaethylene glycol. The product thus obtained was the copolymer of dodecyl methacrylate, mono(dodecyloxy)hexadecaethylene glycol maleate and maleic anhydride in 40:1:1 mole ratio.

EXAMPLE VI

A polyethylene glycol partial ester of methallyl stearate and maleic anhydride 1:1 copolymer was prepared by the procedure employed in Example I above. The resulting copolymer was the same except that it contained monomer units of methallyl stearate in place of allyl stearate.

In general, excellent detergent and antiwear properties can be imparted to lubricating oils by dissolving therein a quantity of from about 0.1 to 10% by weight of the copolymers of the type described above, although a preferred range is from about 0.5 to 5% by weight. Lubricating oil concentrates comprising an oil of lubricating viscosity and from 10 to 60% by weight of the copolymer of the invention are also included in the present invention. The copolymeric additives of this invention can be used with good effect in the case of any one of a wide variety of oils of lubricating viscosity, or of blends of such oils. Thus, the base oil can be a refined Pennsylvania or other paraffin base oil, a refined naphthenic base oil, or a synthetic hydrocarbon or non-hydrocarbon oil of lubricating viscosity. As synthetic oils there can be mentioned alkylated waxes and similar alkylated hydrocarbons of relatively high molecular weight, hydrogenated polymers of hydrocarbons, and the condensation products of chlorinated alkyl hydrocarbons with aromatic compounds. Other suitable oils are those which are obtained by polymerization of lower molecular weight alkylene oxides such as propylene and/or ethylene oxide. Still other synthetic oils are obtained by etherification and/or esterification of the hydroxy groups in alkylene oxide polymers such as, for example, the acetate of the 2-ethylhexanol-initiated polymer of propylene oxide. Other important classes of synthetic oils include the various esters as, for example, di(2-ethylhexyl)sebacate, tricresyl phosphate and silicate esters. If desired, the oil can be a mixture of mineral and synthetic oils.

While satisfactory lubricant compositions can be obtained by adding to the base oil employed only one or more of the copolymeric additives of the type described above, it also falls within the purview of this invention to provide lubricant compositions which contain not only such copolymers, but also other additives such as pour point depressants, oiliness and extreme pressure agents, antioxidants, corrosion inhibiting agents, blooming agents, thickening agents, and/or compounds for enhancing the temperature-viscosity characteristics of the oil. The present invention also contemplates the addition to the lubricant composition (particularly when the amount of copolymer employed is relatively small) of auxiliary detergents and/or antiwear agents.

The efficacy of copolymeric additives of the type described above as detergents and antiwear agents in lubricating oils is illustrated by data from a number of tests. In the tests from which the data is obtained, the base oil, unless otherwise specified, is a solvent-refined, wax-free SAE-30 grade mineral lubricating oil having a viscosity index of 85 which is derived from California waxy crude. Various amounts of the copolymeric additives are incorporated into the oil as noted in terms of percent by weight.

In the Lacquer Deposition Test the low temperature detergency of the oils tested is measured by determining the ability of the oil to solubilize and retain typical engine fuel deposits and precursors thereof which are formed due to incomplete combustion of the fuel. Retention of these deposits in a given oil depends upon their dispersal and upon minimizing their polymerization to lacquer.

Briefly described, the Lacquer Deposition Test involves condensing fresh cool flame oxidation products from a standard test fuel simulating the fuel combustion products of an internal combustion engine in a steel vessel containing a certain amount of the lubricating oil being tested. The steel surface of the vessel acts as an iron catalyst for polymerization of the fuel oxidation products to lacquer in the same manner as the steel surfaces in an internal combustion engine. After the oxidation products have been condensed, the steel vessel containing the lubricating oil is heated for 24 hours at a temperature selected to correspond with actual engine conditions. The test oil is then decanted while hot from the lacquer deposits formed in the steel vessel due to polymerization and the lacqer deposits are do-oiled and weighed.

In the actual test a low grade gasoline is employed of the type described in connection with the standard FL-2 test procedure given below. The gasoline at a rate of 13.3 cc. per hour is vaporized and mixed with air, the air rate being 1.75 liters per minute. The vapor mixture of gasoline and air is then fed into an elongated cool flame combustion chamber of standard design having a diameter of 1½ inches. The cool flame combustion chamber is maintained at 695° F. The test is continued for 1 hour during which the oxidation products issuing from the cool flame combustion chamber are condensed into the weighed steel catalyst vessel which contains 30 g. of the oil being tested at about room temperature. The steel vessel containing test oil and condensed oxidation products is then heated for 24 hours at 110° F. The oil is decanted from the lacquer deposits in the vessel, following which the deposits are de-oiled by washing with petroleum solvent. The increase in weight of the steel vessel due to the lacquer deposits is then determined and recorded in milligrams as "LD" or "lacquer deposit."

The lacquer deposit for any given lubricant composition obtained in accordance with the procedure described above is directly correlated to the "piston varnish rating" or "PVR" obtained for the same lubricant composition in the standard FL-2 test procedure previously referred to and hereinafter more particularly described. Table II which follows gives the correlated values for both the lacquer deposits and piston varnish ratings.

*Table II*

| LD | PVR | LD | PVR |
|-----|-----|-----|-----|
| 140 | 9.5 | 335 | 6.0 |
| 170 | 9.0 | 370 | 5.5 |
| 190 | 8.5 | 420 | 5.0 |
| 220 | 8.0 | 480 | 4.5 |
| 245 | 7.5 | 570 | 4.0 |
| 275 | 7.0 | 700 | 3.5 |
| 305 | 6.5 | 850 | 3.0 |

The correlated values in the above table provide an accurate means for estimating from the lacquer deposits determined for a given oil the piston varnish rating to be obtained in the standard FL-2 Chevrolet engine test.

In the test where the piston varnish ratings are obtained, a given lubricating oil composition is tested as the crankcase lubricant in a 6-cylinder Chevrolet engine using a low grade gasoline especially prone to cause engine deposits, the conditions being those defined in the standard FL-2 test procedure as described in the June 21, 1948, report of the Coordinating Research Council. This procedure requires the maintenance of a jacket temperature of 95° F. and a crankcase oil temperature of 155° F. at 2500 r.p.m. and 45 brake horsepower of 40 hours, and therefore closely simulates the relatively "cold" engine conditions which are normally experienced in city driving. At the end of each test, the engine is dismantled and the amount of engine deposits on the piston determined and expressed as the piston varnish rating. This value is obtained by visually rating (on a scale of 0 to 10, with 10 representing the absence of any deposit) the amount of deposit on each piston skirt and averaging the individual ratings so obtained for the various pistons. Under the conditions of this test, a piston varnish rating of 4.5 is indicative of satisfactory performance, though preferably this rating should be 5 or above. The wear experienced by the piston rings during the test is also measured in certain cases and expressed in mgs. of metal lost per hour. 5 mgs. per hours is regarded as satisfactory, though preferably the loss should be 3 mgs. or less per hour. In the case of the base oil alone without the addition of any additives it is found that the piston varnish rating is approximately 3.0 and the piston ring weight loss is 5.5 mgs./hr. On the other hand, as indicated by the data presented in Table III below, when the base oil is compounded with the indicated amounts of a copolymer, greatly superior results are obtained.

Table III

| Lubricant composition | Ratio of (1) monomer to (2) monomer to (3) monomer, etc. | Piston varnish rating | Lacquer deposit (milligrams) | Piston varnish rating (estimated from lacquer deposit) | Piston ring wear rate, mg./hr. |
|---|---|---|---|---|---|
| Base oil alone | | 3.0 | 850 | | 5.0 |
| 2.8% copolymer of (1) dodecyl methacrylate, (2) mono (dodecyloxy) hexadecaethylene glycol maleate and (3) maleic anhydride in base oil | 40/1/1 | | 450 | 4.9 | |
| 1.5% copolymer of (1) dodecyl methacrylate, (2) allyl stearate, (3) mono (methoxy decaethylene glycol) maleate and (4) maleic anhydride in base oil | 20/1/0.4/0.6 | 5.2 | | | |
| 2.5% copolymer of (1) allyl stearate, (2) didodecyl maleate and (3) dodecyl nonaethylene glycol maleate in base oil | 3/2/1 | 4.3 | | | |
| 1.0% copolymer of (1) allyl stearate, (2) maleic anhydride and (3) mono (methoxy dodecaethylene glycol)-maleate in base oil | 3/2/1 | 4.9 | | | |
| 2.5% copolymer of (1) dodecyl methacrylate, (2) allyl stearate, (3) mono (methoxy dodecaethylene glycol) maleate and (4) maleic anhydride in base oil | 20/1/1/1 | 5.2 | | | |

The utility of still other lubricant compositions in accordance with the invention in which various representative oils of lubricating viscosity are employed is illustrated by the additional examples given in the following table:

Table IV

| Lubricant composition | Base oil | Ratio of (1) monomer to (2) monomer to (3) monomer | Viscosity at 100° F., S.S.U. | Viscosity at 210° F., S.S.U. | Viscosity index |
|---|---|---|---|---|---|
| Base oil alone | 140 Neutral mineral lubricating oil | | 139.4 | 42.13 | 90 |
| 2.8% copolymer of (1) dodecyl methacrylate, (2) mono(dodecyloxy)hexadecaethylene glycol maleate and (3) maleic anhydride in base oil. | do | 40/1/1 | 190.0 | 48.8 | 133 |
| Base oil alone | Mixed hexyl-octyl orthosilicate | | 45.19 | 33.52 | 183 |
| 2.8% copolymer of (1) dodecyl methacrylate, (2) mono(dodecyloxy)hexadecaethylene glycol maleate and (3) maleic anhydride in base oil. | do | 40/1/1 | 50.99 | 36.12 | 232 |
| Base oil alone | Octyloxy octapropylene glycol acetate | | 86.64 | 39.81 | 170 |
| 2.8% copolymer of (1) dodecyl methacrylate, (2) mono(dodecyloxy)hexadecaethylene glycol maleate and (3) maleic anhydride in base oil. | do | 40/1/1 | 108.9 | 44.59 | 174 |
| Base oil alone | Dioctyl phthalate | | 139.8 | 40.28 | 10 |
| 2.8% copolymer of (1) dodecyl methacrylate, (2) mono(dodecyloxy)hexadecaethylene glycol maleate and (3) maleic anhydride in base oil. | do | 40/1/1 | 201.2 | 46.88 | 103 |

From the tests of the foregoing table it will be seen that each of the illustrative compositions containing the copolymeric lubricating oil additives according to the invention possess improved lubricating properties compared to the base oils alone.

In the foregoing description of the invention, the term "hydrocarbyl" is used with reference to the class of organic groups commonly known as "hydrocarbon groups." As employed herein, this term is considered to be a more convenient and concise generic expression for describing said hydrocarbon groups.

This application is a continuation-in-part of Lowe, Stewart and Stuart, patent application Serial No. 345,706; filed March 30, 1953 and now abandoned.

We claim:

1. An oil-soluble copolymer of monomers selected from at least each of the first two classes of the classes consisting of (1) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms, (2) at least one ester selected from the group consisting of monoesters and diesters of $\alpha,\beta$-ethylenically unsaturated $\alpha,\beta$ dicarboxylic acids of from 4 to 12 carbon atoms each, wherein the carboxyl groups of said acids are monoester-linked to a member of the group consisting of poly-1,2-alkylene glycols having a molecular weight between about 400 and 10,000 and from 2 to 7 carbon atoms in each alkylene group and monoalkyl ethers thereof and (3) acidic compounds selected from the group consisting of $\alpha,\beta$-ethylenically unsaturated monocarboxylic acids of from 3 to 15 carbon atoms each, $\alpha,\beta$-ethylenically unsaturated $\alpha,\beta$ dicarboxylic acids of from 4 to 12 carbon atoms each, anhydrides and monoesters of said dicarboxylic acids in which the alcohol moiety of the ester group is an aliphatic hydrocarbon containing from 8 to 30 carbon atoms, there being present from 1 to 20 monomer units of the oil-solubilizing component (1) for each monomer unit of components (2) and (3), said copolymer having an apparent molecular weight of at least 2,000 as determined by the light scattering method and a solubility in lubricating oil of at least 0.5% by weight.

2. An oil-soluble copolymer of (1) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms, (2) at least one ester selected from the group consisting of monoesters and diesters of $\alpha,\beta$-ethylenically unsaturated $\alpha,\beta$ dicarboxylic acids of from 4 to 12 carbon atoms each, wherein the carboxyl groups of said acids are monoester-linked to a member of the group consisting of poly-1,2-alkylene glycols having a molecular weight between about 400 and 10,000 and from 2 to 7 carbon atoms in each alkylene group and monoalkyl ethers thereof, and (3) acidic compounds selected from the group consisting of $\alpha,\beta$-ethylenically unsaturated monocarboxylic acids of from 3 to 15 carbon atoms each, $\alpha,\beta$-ethylenically unsaturated $\alpha,\beta$ dicarboxylic acids of from 4 to 12 carbon atoms each, anhydrides and monoesters of said dicarboxylic acids in which the alcohol moiety of the ester group is an aliphatic hydrocarbon containing from 8 to 30 carbon atoms, there being present from 1 to 20 monomer units of the oil-solubilizing component (1) for each monomer unit of components (2) and (3), said copolymer having an apparent molecular weight of at least 2,000 as determined by the light scattering method and a solubility in lubricating oil of at least 0.5% by weight.

3. An oil-soluble copolymer of (1) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms and (2) at least one ester selected from the group consisting of monoesters and diesters of $\alpha,\beta$-ethylenically unsaturated $\alpha,\beta$ dicarboxylic acids of from 4 to 12 carbon atoms each, wherein the carboxyl groups of said acids are monoester-linked to a member of the group consisting of poly-1,2-alkylene glycols having a molecular weight between about 400 and 10,000 and from 2 to 7 carbon atoms in each alkylene group and monoalkyl ethers thereof, there being present from 1 to 20 monomer units of the oil-solubilizing component (1) for each monomer unit of component (2), said copolymer having an apparent molecular weight of at least 2,000 as determined by the light scattering method and a solubility in lubricating oil of at least 0.5% by weight.

4. An oil-soluble copolymer of monomers selected from at least each of the first two classes of the classes consisting of (1) polymerizable oil-solubilizing compounds selected from the group consisting of olefinic hydrocarbons, olefinic ethers containing a single oxygen atom and hydrocarbon carboxylic acids containing at most two carboxy groups fully esterified with monohydroxy hydrocarbons, said compounds having a single ethylenic linkage and containing a monovalent hydrocarbon group of from 8 to 30 aliphatic carbon atoms, (2) at least one ester selected from the group consisting of monoesters and diesters of $\alpha,\beta$-ethylenically unsaturated $\alpha,\beta$ dicarboxylic acids of from 4 to 12 carbon atoms each, wherein the carboxyl groups of said acids are monoester-linked to a member of the group consisting of polyethylene glycols having a molecular weight between about 400 and 10,000 and monoalkyl ethers thereof and (3) acidic compounds selected from the group consisting of $\alpha,\beta$-ethylenically unsaturated monocarboxylic acids of from 3 to 15 carbon atoms each, $\alpha,\beta$-ethylenically unsaturated $\alpha,\beta$ dicarboxylic acids of from 4 to 12 carbon atoms each, anhydrides and monoesters of said dicarboxylic acids in which the alcohol moiety of the ester group is an aliphatic hydrocarbon containing from 8 to 30 carbon atoms, there being present from 1 to 20 monomer units of the oil-solubilizing component (1) for each monomer unit of components (2) and (3), said copolymer having an apparent molecular weight of at least 2,000 as determined by the light scattering method and a solubility in lubricating oil of at least 0.5% by weight.

5. An oil-soluble copolymer of (1) a mixture of allyl stearate and didodecyl maleate and (2) dodecyl nonaethylene glycol maleate, there being present from 1 to 20 monomer units of the oil-solubilizing component (1) for each monomer unit of component (2), said copolymer having an apparent molecular weight of 2,000 as determined by the light scattering method and a solubility in lubricating oil of at least 0.5% by weight.

6. An oil-soluble copolymer of (1) allyl stearate, (2) mono(methoxy dodecaethylene glycol)maleate and (3) maleic anhydride, there being present from 1 to 20 monomer units of the oil-solubilizing component (1) for each monomer unit of components (2) and (3), said copolymer having an apparent molecular weight of 2,000 as determined by the light scattering method and a solubility in lubricating oil of at least 0.5% by weight.

7. An oil-soluble copolymer of (1) a mixture of dodecyl methacrylate and allyl stearate, (2) mono(methoxy dodecaethylene glycol)maleate and (3) maleic anhydride, there being present from 1 to 20 monomer units of the oil-solubilizing component (1) for each monomer unit of components (2) and (3), said copolymer having an apparent molecular weight of 2,000 as determined by the light scattering method and a solubility in lubricating oil of at least 0.5% by weight.

References Cited in the file of this patent

UNITED STATES PATENTS

| | | |
|---|---|---|
| 1,970,578 | Schoeller et al. | Aug. 21, 1934 |
| 2,047,398 | Voss et al. | July 14, 1936 |
| 2,255,313 | Ellis | Sept. 9, 1941 |
| 2,570,861 | Roedel | Oct. 9, 1951 |
| 2,615,844 | Giammaria | Oct. 28, 1952 |
| 2,618,845 | Lippencott | Oct. 28, 1952 |